United States Patent [19]

Moritsch

[11] 4,327,465

[45] May 4, 1982

[54] HANDLE FOR TOOL HAVING A TANG

[76] Inventor: Fred A. Moritsch, 171 Las Flores, Nipomo, Calif. 93444

[21] Appl. No.: 190,333

[22] Filed: Sep. 24, 1980

[51] Int. Cl.³ .................. B23D 71/04; B25G 1/00; B23B 5/22

[52] U.S. Cl. .......................... 29/80; 30/340; 81/177 R; 145/61 J; 279/96

[58] Field of Search .......... 29/76 R, 78, 80; 145/61 C, 61 J; 81/177 R; 279/96; 30/340, 342, 329, 332

[56] References Cited

U.S. PATENT DOCUMENTS

| 483,865 | 10/1892 | Dangerfield | 29/80 |
| 1,436,556 | 11/1922 | Woodworth | 145/61 J |
| 2,788,574 | 4/1957 | Marcmann | 30/332 |
| 3,520,059 | 7/1970 | Gringer | 30/340 |

FOREIGN PATENT DOCUMENTS

| 209911 | 10/1955 | Australia | 29/80 |
| 7421538 | 1/1976 | France | 29/80 |

Primary Examiner—Harrison L. Hinson
Attorney, Agent, or Firm—Michael, Best & Friedrich

[57] ABSTRACT

Disclosed herein is a handle for a tool having a shank, which handle comprises identical first and second half sections in mating engagement, which first and second half sections each include cooperating wall means defining a socket for receiving the shank and, when the shank is received in the socket, for preventing relative movement between the half sections in each of three planes mutually perpendicular to each other.

19 Claims, 14 Drawing Figures

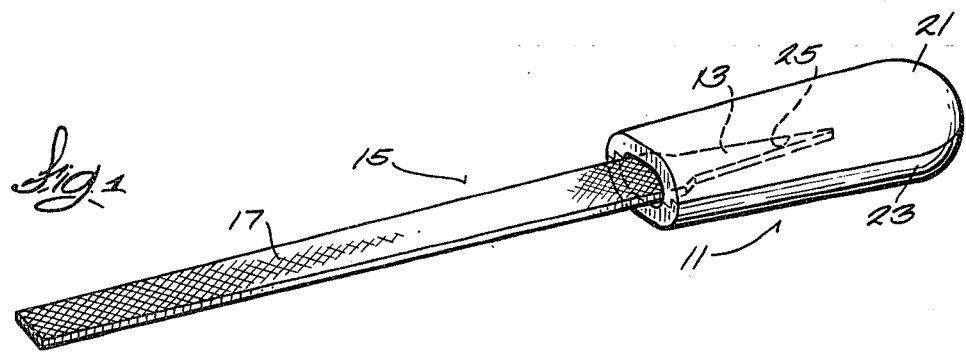
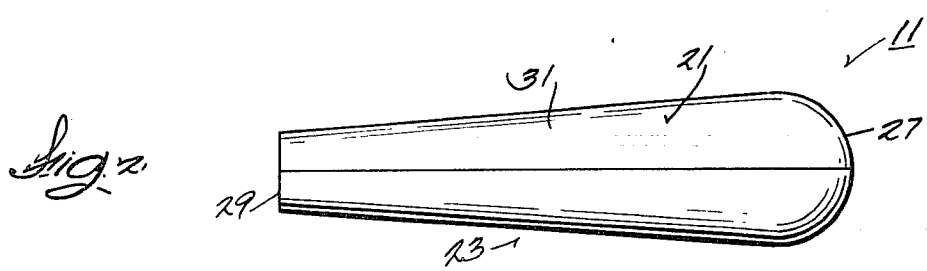
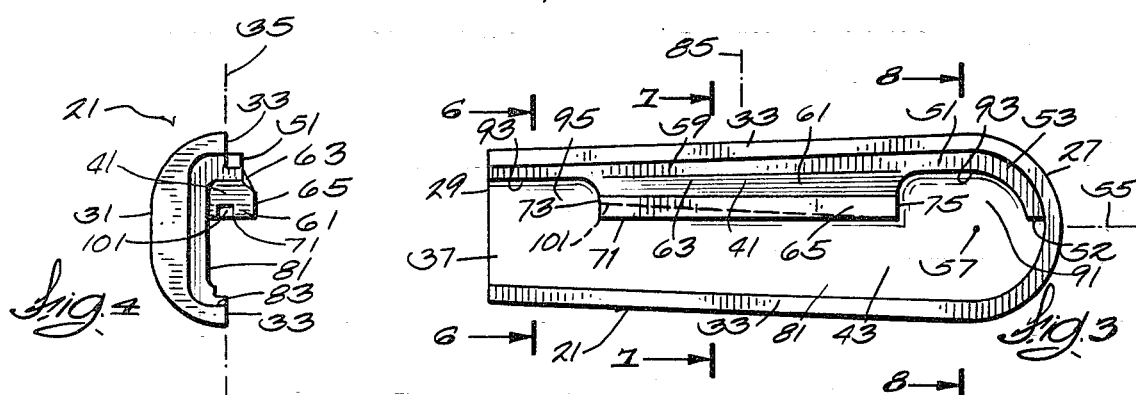
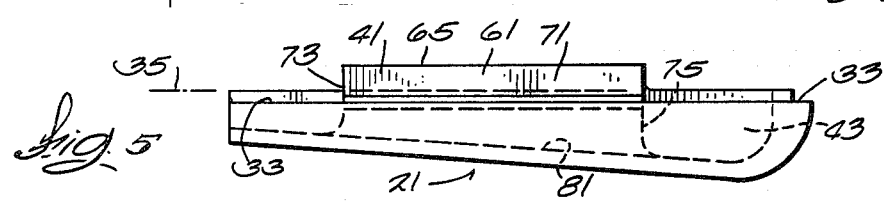
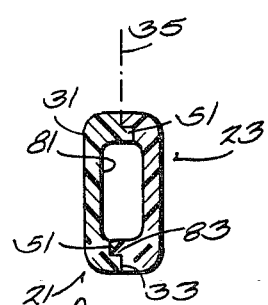
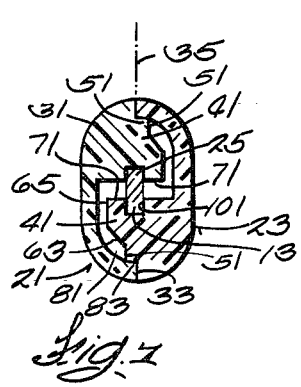
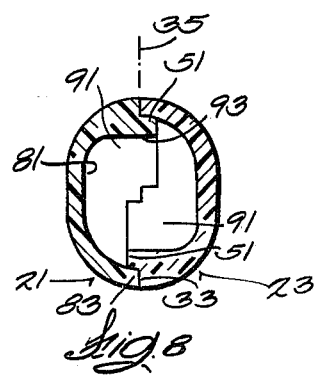

HANDLE FOR TOOL HAVING A TANG

BACKGROUND OF THE INVENTION

The invention relates generally to handles for tools, such as files, which have a tang or shank which is adapted to be received in the handle, which is elongated, and which taper in the direction of the the length of the tang.

SUMMARY OF THE INVENTION

The invention provides a handle for a tool having a shank, which handle comprises identical first and second half sections in mating engagement, which half sections each include cooperating wall means defining a socket for receiving the shank and, when the shank is received in the socket, for preventing relative movement between the half sections in each of three planes mutually perpendicular to each other.

In one embodiment of the invention, the cooperating wall means includes respective mating surfaces on each of the half sections in engagement transversely of the length of the half sections to prevent relative movement therebetween in the directions of the length of the half sections.

In one embodiment of the invention, the cooperating wall means includes respective mating surfaces on each of the half sections in engagement transversely of a line extending perpendicularly to the length of the half sections to prevent relative movement therebetween in the directions of the line.

In one embodiment in accordance with the invention, the cooperating wall means define, in each of the half sections, a peripheral surface located in a mating plane, and inwardly of the peripheral surface, a recessed portion, and a raised portion.

In one embodiment in accordance with the invention, the half sections each include a square end and a round end and the raised portion includes a lip located inwardly of the peripheral surface and extending from the round end to the square end, and a raised part spaced from the round end and from the square end and located inwardly of the lip.

In one embodiment in accordance with the invention, the recessed portion includes an inside surface defining a recess bounded by the peripheral surface, which inside surface includes a margin located adjacent the peripheral surface and engageable with the lip of another half section to prevent relative movement of the half sections in the mating plane.

In one embodiment of the invention, the raised part and the recessed portion are defined, in part, by an end surface which extends above and below the mating plane, whereby when the half sections are engaged with each other, the surface above the mating plane on one of the half sections engages the surface below the mating plane of the other half section to prevent relative movement of the half sections in the mating plane.

In one embodiment of the invention, the raised part of the recessed portion are defined, in part, by a side surface which extends above and below the mating plane, and which includes a groove, which extends equally on each side of the mating plane, and which has a cross-section which progressively decreases at a uniform rate in the direction from the square end toward the round end of the handle.

Other features and advantages of the embodiments of the invention will become known by reference to the following general description, claims and appended drawings.

IN THE DRAWINGS

FIG. 1 is a perspective view of a file having a handle embodying various of the features of the invention.

FIG. 2 is a view of the outside of one of the handle sections of the handle shown in FIG. 1.

FIG. 3 is a view of the inside of the handle section shown in FIG. 2.

FIG. 4 is an end view of the handle section shown in FIG. 2.

FIG. 5 is a side view of the handle section shown in FIG. 2.

FIG. 6 is a sectional view of the handle taken along line 6—6 of FIG. 3.

FIG. 7 is a sectional view of the handle taken along line 7—7 of FIG. 3.

FIG. 8 is a sectional view of the handle taken along line 8—8 of FIG. 3.

Figure 9:
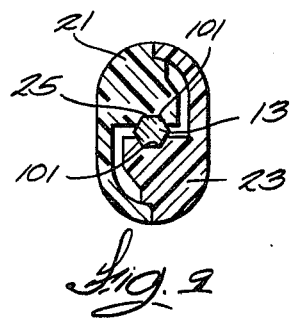
FIGS. 9 through 14 are views similar to FIG. 7 illustrating modified handles for receiving tangs of different shapes.

Before explaining one embodiment of the invention in detail, it is to be understood that the invention is not limited in its application to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

GENERAL DESCRIPTION

Shown in the drawings is a handle 11 which is provided on a tang or shank 13 of a tool 15, such as a file. As illustrated, the tool 15 includes a file part 17 and the tang 13 is elongated and extends from one end of the file part 17, is of generally constant depth, tapers in width from the file part 17 to the end of the tang, and has a generally rectangular cross-section in a plane perpendicular to the length of the tang.

The handle 11 consists of two identically constructed half sections 21 and 23 which can readily and desirably be fabricated of a suitable plastic, as, for instance, by molding. When assembled, the half sections 21 and 23 define a socket 25 for the tang 13, and when the tang 13 is located in the socket 25, movement of the half sections 21 and 23 relative to each other is prevented, without the use of fasteners.

As both half sections 21 and 23 are identical, only the half section 21 will be described. As shown, the handle half section 21 is generally elongated, having a round end 27, a spaced square end 29, and an outer surface 31 (See FIGS. 2 and 4) which is generally convex in cross section taken at a right angle to the length of the half section 21. The half section 21 further includes wall means which cooperate with identical wall means on the half section 23 so as to define the socket 25 and so as, when the tang 13 is in the socket 25, the prevent relative movement between the half sections 21 and 23 in each of three mutually perpendicular planes.

The wall means are configured so as to define (See FIG. 3) a relatively narrow peripheral surface 33 which extends in a mating plane 35 (See FIGS. 4 through 8) and completely around the periphery of the half section 21 except that the peripheral surface does not extend completely along the square end 29 in order to provide an opening 37 for access to the socket 25 which is formed when the half sections 21 and 23 are assembled. The wall means is also configured so as to define a raised portion 41 located inwardly of the peripheral surface 33, and principally on the upper part thereof as shown in FIG. 3, and a recessed portion 43 located principally in the lower part therein as also shown in FIG. 3, for receipt of the raised portion of the other handle half section 23.

The raised portion 41 includes a lip 51 which extends immediately inwardly of the peripheral surface 33 and which includes an arcuate portion 53 extending from the longitudinal center line 55 at the round end 27 for slightly more than about 90° about the axis 57, together with a generally straight portion 59 which extends from the arcuate portion 53 to the square end 29. The end surface 52 of the lip 51 adjacent the round end 27 could be located on the longitudinal center line 55 for mating engagement with the end surface of the other half section. In the disclosed construction, the end surface 52 is slightly spaced from the longitudinal center line 55.

Extending inwardly of a central part of the straight portion 59 of the lip 51 is a raised part 61 which extends to adjacent the longitudinal center line 55 and which includes an upwardly inclined surface 63 extending from the lip 51 and a top surface 65 extending from the inclined surface 63 to adjacent the longitudinal center line 55 and in generally parallel relation to the mating plane 35. The raised part 61 is also defined by a side surface 71 which extends perpendicularly to the mating surface 35 and adjacent to the longitudinal center line 55 and which extends to the inner surface of the recessed portion 43 as will be explained hereinafter. If desired the side surface 71 could extend to the longitudinal center line 55 for mating engagement with the side surface of the other half section. In the disclosed construction, the side surface 71 is spaced somewhat from the longitudinal center line 55.

In addition, the raised portion includes a left end and a right end, which ends are defined by respective surfaces 73 and 75 which extend above and below the mating plane 35 and to the inner surface of the recessed portion 43 which will be explained hereinafter.

The recessed portion 43 includes an inner or inside surface 81 which is spaced from the outer surface 31 at a generally uniform distance except that, adjacent to the lip 51, the inner surface 81 is spaced from the outer surface 31 at a distance equal to the width of the peripheral surface 33 and the lip 51. The inner surface 81 merges into the side surface 71 and includes adjacent the peripheral surface 33 a margin 83 which engages the lip 51 of the half section 23 so as to prevent relative movement between the half sections 21 and 23 in the mating plane 35 in one direction along the center line 55 and in both directions along a line 85 perpendicular to the center line 55.

The recessed portion 43 also includes a recess segment 91 which extends, at the round end 27, into the upper part in an area defined by the inner surface 93 of the lip 51 and by the right end surface 75 of the raised part 61. In the area of the recess segment 91, the inside surface 81 merges into the right end surface 75 and the inner surface 93 of the lip 51.

The recessed portion 43 also includes a recess segment 95 which extends at the square end 29 to the inner surface 93 of the lip 51 and from the square end 29 to the left end surface 73 of the raised part 61. In the area of the recess segment 95, the inside surface 81 merges into the left end surface 73 and the inner surface 93 of the lip 91.

As a consequence of the structure disclosed above, when the handle sections 21 and 23 are joined together, the peripheral surfaces 33 mate with each other and the lip 51 of one of the half sections is matingly engaged with the margin 83 of the inside surface 81 of the other half section so that the interfitting relationship between the lip 51 and the margin 83 prevents movement between the half sections 21 and 23 in the mating plane 35 as already explained.

In addition, mating engagement between the right end surface 75 above the mating plane 35 on one of the half sections 21 and 23 and the right end surface 75 below the mating surface on the other of the half sections 21 and 23 prevents relative movement between the half sections 21 and 23 in the mating plane 35. Thus, interfitting of the half sections 21 and 23 prevents relative movement in any direction in the mating plane.

The height of the raised part 61 from the mating plane 35 is less than the depth of the recess so that the raised part 61 of one of the half sections 21 and 23 may be wholly received within the recessed portion 43 of the other of the half sections 21 and 23.

In order to provide the socket 25, the side surface 71 is provided with a groove 101 which extends in parallel relation to the mating plane 35 and to an equal extent on each side of the mating plane 35. In order to obtain the desired taper, the groove 101 has a maximum depth at the left end surface 73 of the raised part 61 and progressively diminishes in depth until adjacent to the right end surface 75 of the raised part 61. As a consequence, when the handle half sections 21 and 23 are assembled, the grooves 101 define therebetween the socket 25 which is centered on the longitudinal center line 55 and on the mating plane, and which tapers from the left to the right. In addition, the presence of the tool tang 13 in the socket 25 prevents relative movement of the handle sections 21 and 23 in the directions away from the mating plane 35.

Because of the tapered form of the tool tang 13 and of the socket 25 therefor, frictional resistance will normally hold the tang 13 in the handle 11. Furthermore, gripping of the handle by a user will hold together the half sections 21 and 23, thereby further increasing the force holding the tool 15 in the handle 11.

FIG. 9 is illustrative of a handle configured to receive a tang 13 having a tapering hexagonal cross section. As illustrated, the handle half sections 21 and 23 define a tapering hexagonal socket 25 which diminishes in cross section from the square end to the round end of the handle.

Figure 10:
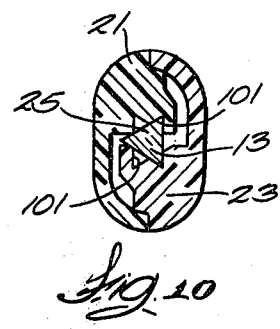

FIG. 10 is illustrative of a handle configured to receive a tapering tang 13 which has a cross section in the shape of an equiangular triangle. As illustrated, the handle half sections 21 and 23 define a tapering socket 25 which has the shape of a six-sided star and which diminishes in cross section from the square end to the round end of the handle.

Figure 11:
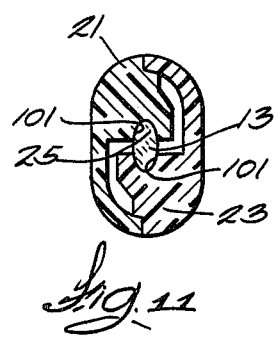

FIG. 11 is illustrative of a handle configured to receive a tapering tang 13 having an elliptical cross section. As illustrated, the handle half sections 21 and 23 define a tapering socket 25 which has an elliptical shape and which diminishes in cross sectional dimension in the direction from the square end to the round end of the handle.

Figure 12:
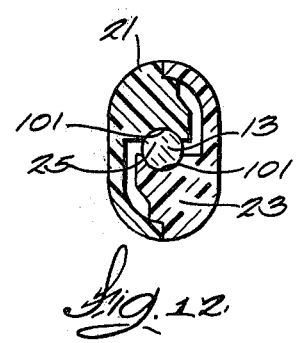

FIG. 12 is illustrative of a handle configured to receive a conical tang 13 which has a circular cross section. As illustrated, the handle half sections 21 and 23 define a conical socket 25 which diminishes in cross section from the square end to the rounded end of the handle.

Figure 13:
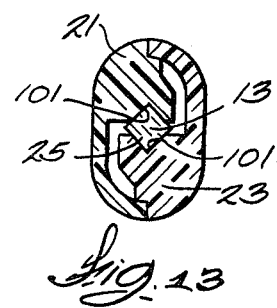

FIG. 13 is illustrative of a handle configured to receive a tang 13 having a square or diamond-shaped cross section. As illustrated, the handle half sections 21 and 23 define a square or diamond-shaped socket 25 which diminishes in cross section from the square end to the round end of the handle.

Figure 14:
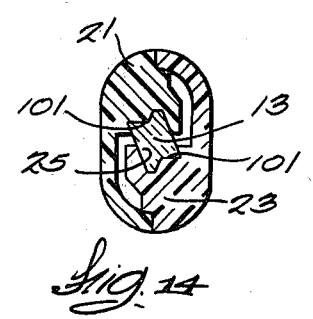

FIG. 14 is illustrative of a handle configured to receive a tang 13 having a free form cross section which tapers in the direction of the length of the tang. As illustrated, the handle half sections 21 and 23 define a socket of free form cross section which diminishes in dimension from the square end to the round end of the handle.

In all of the embodiments of FIGS. 9 through 14, receipt of the tang 13 in the socket 25 prevents separation of the handle half sections 21 and 23 away from each other in directions normal to the peripheral surfaces.

Various of the features of the invention are set forth in the following claims.

I claim:

1. A handle for a tool having a shank, said handle comprising identical first and second half sections in mating engagement, said first and second half sections each including cooperating wall means defining a socket for receiving the shank and, when the shank is received in said socket, for preventing relative movement between said half sections in each of three planes mutually perpendicular to each other.

2. A handle in accordance with claim 1 wherein said half sections are molded of plastic.

3. A handle in accordance with claim 1 wherein said cooperating wall means includes respective mating surfaces on each of said half sections in engagement transversely of the length of said half sections to prevent relative movement therebetween in the directions of the length of said half sections.

4. A handle in accordance with claim 1 wherein said cooperating wall means includes respective mating surfaces on each of said half sections in engagement transversely of a line extending perpendicularly to the length of said half sections to prevent relative movement therebetween in the directions of the line.

5. A handle in accordance with claim 1 wherein said cooperating wall means includes respective first surfaces on each of said half sections in engagement transversely of the length of said half sections to prevent relative movement therebetween in the directions of the length of said half sections and respective second mating surfaces on each of said half sections in engagement transversely of a line extending perpendicularly to the length of said half sections to prevent relative movement therebetween in the directions of the line.

6. A handle in accordance with claim 1 wherein said cooperating wall means define, in each of said half sections, a peripheral surface located in a mating plane, and inwardly of said peripheral surface, a recessed portion, and a raised portion.

7. A handle in accordance with claim 6 wherein said half sections each include a square end and a round end and wherein said raised portion includes a lip located inwardly of said peripheral surface and extending from said round end to said square end, and a raised part spaced from said round end and from said square end and located inwardly of said lip.

8. A handle in accordance with claim 7 wherein said recessed portion includes an inside surface defining a recess bounded by said peripheral surface, said inside surface including a margin located adjacent said peripheral surface and engageable with the lip of another half section to prevent relative movement of said half sections in said mating plane.

9. A handle in accordance with claim 8 wherein said raised part and said recessed portion are defined, in party, by an end surface extending above and below said mating plane, whereby when said half sections are engaged with each other, said end surface above said mating plane on one of said half sections engages said end surface below said mating plane on the other of said half sections to prevent relative movement of said half sections in said mating plane.

10. A handle in accordance with claim 8 wherein each of said half sections includes a longitudinal center line extending between said round end and said square end and wherein said raised part and said recessed portion are defined, in part, by a side surface which extends above and below said mating plane and adjacent to said longitudinal center line.

11. A handle in accordance with claim 10 wherein said side surface includes a groove which extends equally on each side of said mating plane, and which has a cross-section which progressively decreases at a uniform rate in the direction from said square end toward said round end.

12. A handle in accordance with claim 10 wherein said groove cross-section is rectangular.

13. A handle in accordance with claim 10 wherein said groove cross-section is square.

14. A handle in accordance with claim 10 wherein said groove cross-section is circular.

15. A handle in accordance with claim 10 wherein said groove cross-section is elliptical.

16. A handle in accordance with claim 10 wherein said groove cross-section is six sided.

17. A handle in accordance with claim 10 wherein said groove cross-section is hexagonal.

18. A handle in accordance with claim 10 wherein said groove cross-section is star-shaped.

19. A handle in accordance with claim 10 wherein said groove cross-section is diamond-shaped.

* * * * *